United States Patent [19]

Wiley, Jr.

[11] Patent Number: 4,811,972
[45] Date of Patent: Mar. 14, 1989

[54] REAR WHEEL SUSPENSION SYSTEM FOR STRADDLE CARRIERS

[75] Inventor: James G. Wiley, Jr., Yakima, Wash.
[73] Assignee: Comet Trailer Corp., Selah, Wash.
[21] Appl. No.: 96,441
[22] Filed: Sep. 15, 1987
[51] Int. Cl.⁴ .............................................. B60G 5/02
[52] U.S. Cl. .................................... 280/683; 280/677; 280/711
[58] Field of Search .............. 280/677, 678, 711, 683, 280/685, 687, 698, 701

[56] References Cited

U.S. PATENT DOCUMENTS

| | | | |
|---|---|---|---|
| 2,879,076 | 3/1959 | Stricker, Jr. | 280/683 |
| 3,140,880 | 7/1964 | Masser | 280/683 |
| 4,155,570 | 5/1979 | Wiley, Jr. | 280/677 |
| 4,530,515 | 7/1985 | Raidel | 280/683 |
| 4,717,170 | 1/1988 | Paulat et al. | 280/683 |

Primary Examiner—Richard A. Bertsch
Attorney, Agent, or Firm—Brady, O'Boyle & Gates

[57] ABSTRACT

A rear wheel suspension system for straddle carriers wherein a pair of axle mount plates are positioned on each side of the rear end of the carrier frame and each being swingably mounted on a transverse axis trunnion secured to a depending box beam on the straddle carrier frame. Rear wheel axle assemblies for pairs of tandem rear wheels are carried by the medial portions of the axle mount plates. Air springs and shock absorbers are interconnected bewteen the axle mount plates and the carrier frame.

2 Claims, 2 Drawing Sheets

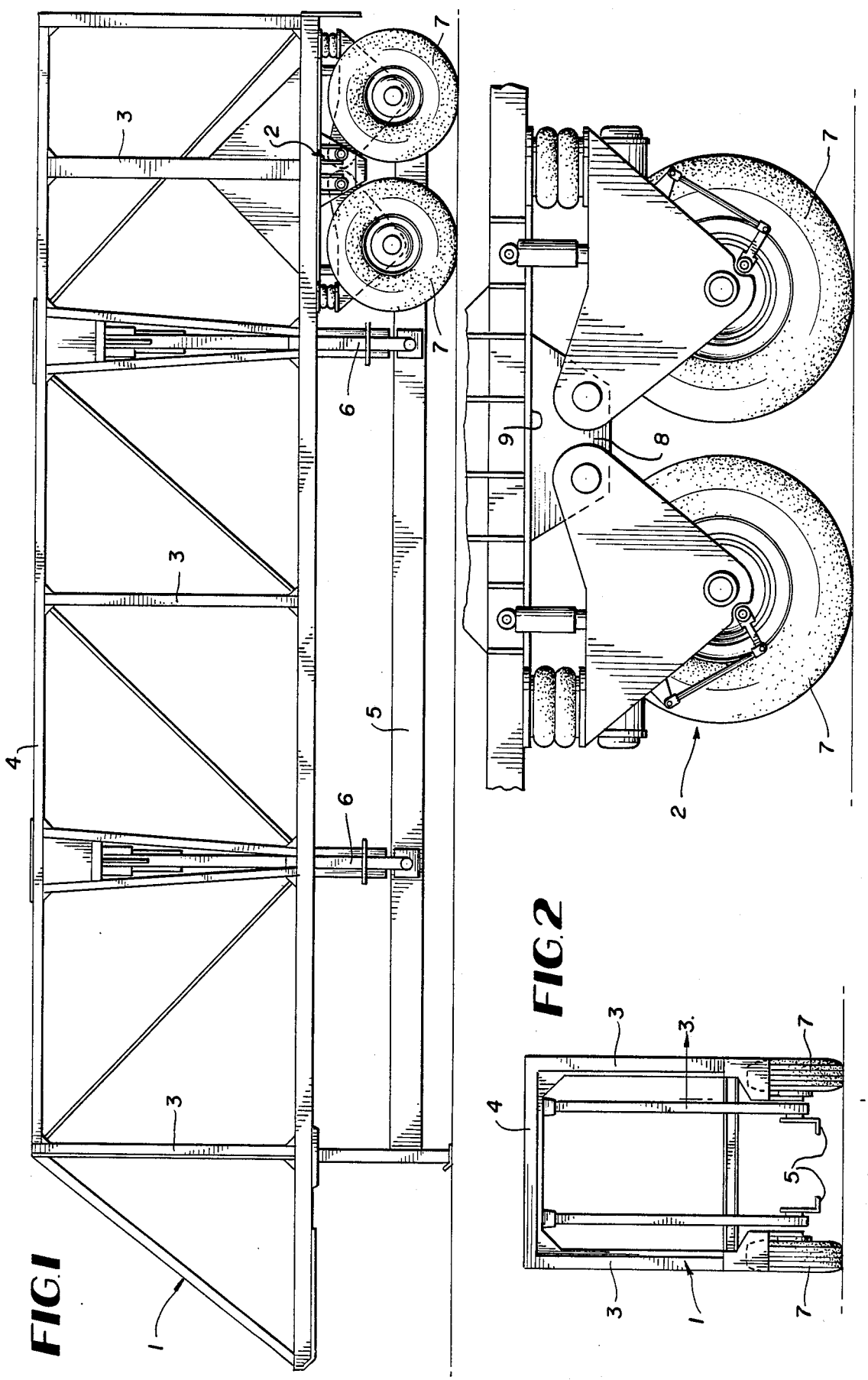

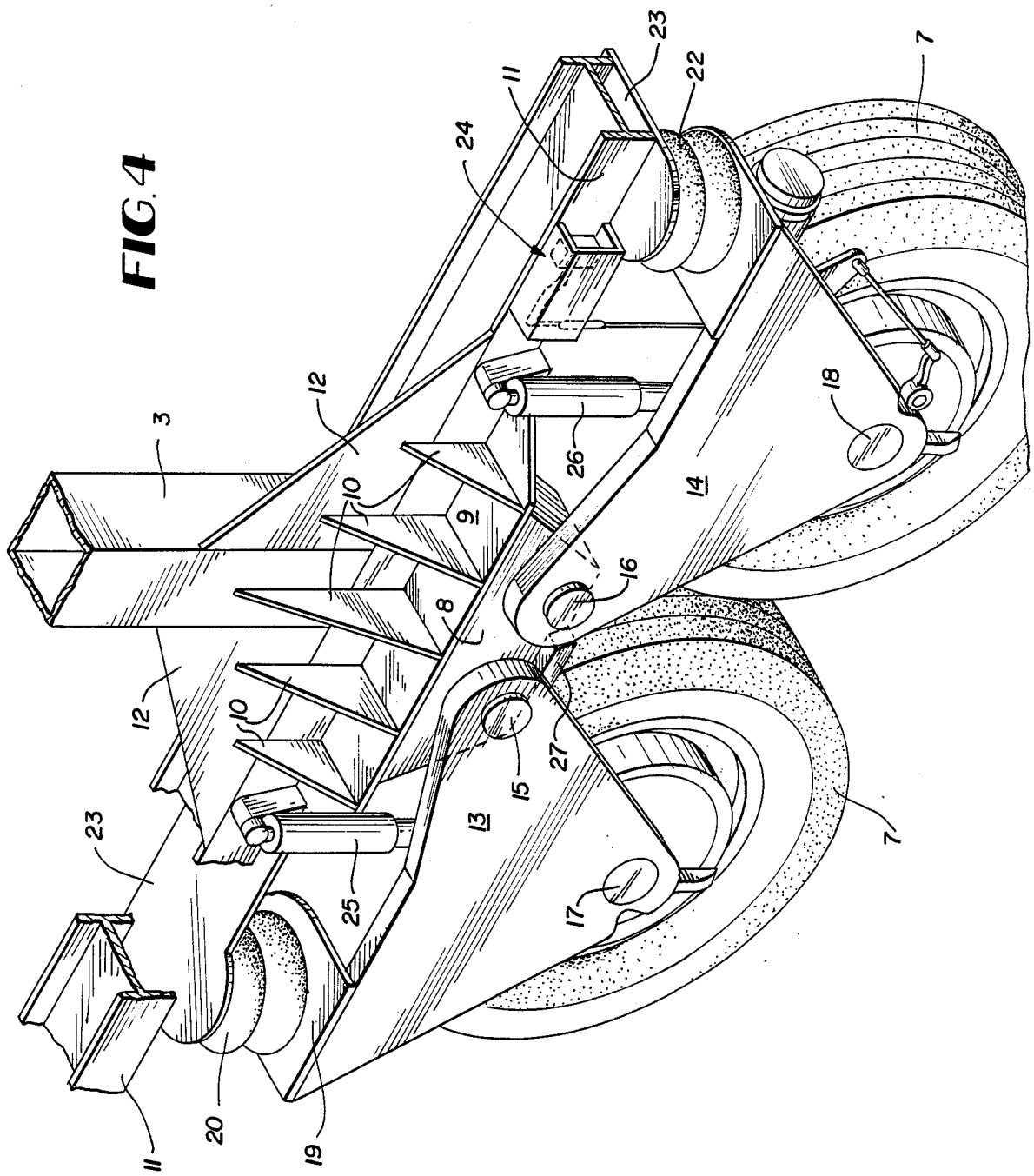

ABSTRACT

REAR WHEEL SUSPENSION SYSTEM FOR STRADDLE CARRIERS

BACKGROUND OF THE INVENTION

Applicant's U.S. Pat. No. 4,155,570 dated May 22, 1979 discloses a rear wheel suspension system for a straddle carrier wherein a longitudinal walking beam is swingably mounted at its center on the straddle frame. Pairs of tandem rear wheels are carried by the forward and rear ends of the walking beam, and shock absorbers are interconnected between the forward and rear ends of the walking beam and the carrier frame.

While the suspension system disclosed in my aforementioned patent has been satisfactory for its intended purpose, the suspension system of the present invention has been devised for not only increasing the freedom of movement of the tandem wheel pairs in relation to ground surface irregularities but also for providing a greatly improved, more efficient, lighter weight and less expensive rear wheel suspension for straddle carriers which will have increased strength and load cushioning ability without complex springing arrangements or numerous mechanical parts.

BRIEF DESCRIPTION OF THE DRAWINGS

FIG. 1 is a side elevational view of a straddle carrier equipped with the suspension system of the present invention;

FIG. 2 is a rear end elevational view of the straddle carrier:

FIG. 3 is a view taken along line 3—3 of FIG. 2; and

FIG. 4 is a fragmentary perspective view of the suspension system of the present invention.

DESCRIPTION OF THE PREFERRED EMBODIMENT

Referring to the drawings and more particularly to FIGS. 1 and 2, the straddle carrier 1, upon which the suspension system 2 of the present invention is mounted, embodies a rigid inverted U-shaped main frame including spaced vertical sides 3 interconnected by a horizontal top 4, the bottom of the carrier frame being open so that it may pass longitudinally over cargo to be lifted and transported by vertically movable power-operated lifting beams 5 and associated arms 6. The general construction and mode of operation of the straddle carrier 1 is well known in the prior art, as noted in my aforementioned U.S. Pat. No. 4,155,570, and therefore need not be described in further detail herein for a proper understanding of the invention.

The suspension system 2 of the present invention is for mounting the rear paired tandem wheels 7 at opposite sides of the carrier 1 near its rear end. Since the wheel suspension system on each side of the carrier is identical, a description of one suspension system will serve to describe both.

As will be seen in FIGS. 3 and 4, each rear wheel suspension system 2 comprises a vertical downwardly tapering box frame 8 constructed of welded plate stock for rigidity and lightness. The vertical box frame 8 has a top cap plate 9 rigid therewith and transversely extending spaced vertical gussets 10 joined not only to the top plate 9 but also to the horizontal longitudinal lower frame member 11 of the straddle carrier, side frame 3 of the carrier and longitudinally spaced, vertical extending gusset plates 12 extending between the carrier frames 3 and 11. A pair of axle mount plates 13 and 14 are pivotally connected to the box frame 8 by trunnion shafts 15 and 16, respectively, whereby axle mount plate 13 extends in a direction toward the front of the carrier and the axle mount plate 14 extends in a direction toward the rear of the carrier. Stub axles 17 and 18 are provided on the lower end portions of the mounting plates upon which the wheels 7 are mounted.

The forward end portion of axle mount plate 13 is provided with an inwardly extending plate 19 providing a cantilevered seat for a bellows-type air spring 20, and the rear end portion of axle mount 14 is similarly provided with an inwardly extending plate 21 providing a seat for an air spring 22. The upper ends of the air springs 20 and 22 engage a longitudinally extending plate 23 welded to the bottom of the carrier frame 11.

A conventional air supply and exhaust valve assembly 24 is mounted on the carrier frame 11 to maintain the air springs at a desired pressure, to thereby position the carrier 1 at a constant height relative to the ground depending upon the load being carried.

Shock absorbers 25 and 26 are connected between the carrier frame 11 and the respective axle mount plates 13 and 14 to control the jounce of the plates 13 and 14, and the air springs 20, 22 when the carrier travels over irregular terrain. A rigid stop member 27 is secured to the box frame 8 and is adapted to be engaged by the axle mount plates 13 and 14 when the limit of downward movement of the axle mount plates 13 and 14 has been reached, to thereby prevent damage to the shock absorbers and air springs.

From the above description, it will be readily apparent to those skilled in the art that the wheel suspension system of the present invention provides a substantially independent suspension for each of the tandem wheels 7, to thereby increase the freedom of movement of the tandem wheels in relation to ground surface irregularities.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a straddle carrier having laterally separated rear tandem wheel pairs, wheel suspension units for each tandem wheel pair, each suspension unit comprising a vertical support frame depending from a lower longitudinal frame member of the carrier, a pair of axle mount plates, one end of each axle mount plate being pivotally connected to said support frame on a transverse axis, one axle mount plate extending in a direction forwardly of the carrier and the other axle mount plate extending in a direction rearwardly of the carrier, an air spring interposed the opposite end of each axle mount plate and the lower longitudinal frame member of the carrier, shock absorbers mounted between the axle mount plates and lower longitudinal frame member of the carrier, to thereby control the jounce of the axle mount plates and air springs, and wheel axle assemblies secured to the medial portion of each axle mount plate and positioned between said one end of the axle mount plate and said air spring in a plane below the transverse pivotal axis and the air spring, whereby the rear tandem wheels are independently pivotal about the transverse axis, and a stop member secured to the vertical support frame between the axle mount plates in proximity to the transverse axes and engageable by the axle mount plates, to thereby limit the downward movement of the axle mount plates, whereby damage to the air springs is prevented.

2. In a straddle carrier according to claim 1, wherein each wheel axle assembly includes a stub axle mounted on the lower end portion of the axle mount plate and a wheel rotatably mounted on said axle.

* * * * *